July 8, 1969   N. R. HARBOTT   3,454,217
LOAD CARRIERS AND CENTRIFUGES
Original Filed Aug. 20, 1965

*INVENTOR*
NORMAN RICHARD HARBOTT

BY
*ATTORNEYS*

INVENTOR
NORMAN RICHARD HARBOTT

United States Patent Office 3,454,217
Patented July 8, 1969

3,454,217
LOAD CARRIERS AND CENTRIFUGES
Norman Richard Harbott, Crawley, England, assignor to Measuring & Scientific Equipment Limited, London, England, a British company
Original application Aug. 20, 1965, Ser. No. 481,196, now Patent No. 3,339,837, dated Sept. 5, 1967. Divided and this application June 30, 1967, Ser. No. 650,395
Claims priority, application Great Britain, Aug. 31, 1964, 35,605/64
Int. Cl. B04b 9/12, 9/02; F16c 9/06
U.S. Cl. 233—26    14 Claims

ABSTRACT OF THE DISCLOSURE

A body supported by a shaft which is free to flex from end-to-end under load so that it acts substantially as a freely supported and uniformly loaded beam to limit the shearing forces upon the shaft, the shaft extending through a passage in the body and the passage widening towards its ends to permit flexing of the shaft within the passage. In a centrifuge the body is a specimen carrier with the shaft mounted upon the centrifuge rotor to permit the carrier to swing relatively to the rotor.

---

This is a division of application Ser. No. 481,196 filed Aug. 20, 1965, now patent No. 3,339,837 issued Sept. 5, 1967.

This invention relates to load carriers and centrifuges.

In accordance with one aspect of the invention, there is provided a device comprising a body and a shaft for supporting the body within, and extending at each end, from a passage extending through the body, the passage having been so formed prior to the insertion of the shaft that the passage has, as seen in a longitudinal cross-section of the passage, two opposite edges each of which is in the form of, or substantially in the form of, an arc of a circle of finite radius having its center disposed on a line at right angles to the axis of, and mid-way between the ends of, the passage and which center is at that side of the edge remote from the other edge.

The expression "the form of an arc of a circle" is to be understood as including a form which deviates from the arc by an amount which is small in relation to the radius of the arc. For example, the form may be that of at least three chords of the arc. In cases in which the edges of a portion of the passage are parallel, that portion will be the central portion of the passage and will have a length less than one half of the total length of the passage.

In accordance with another aspect of the invention, there is provided a method of manufacturing a device having a supporting shaft within and extending at each end from a passage in the body, the method comprising the step of so forming the passage in the device, prior to inserting the shaft in the passage, that the passage has, seen in a longitudinal cross-section of the passage, two opposite edges each of which is in the form of, or substantially in the form of, an arc of a circle of finite radius having its center disposed on a line at right angles to the axis of, and midway between the ends of, the passage and which center is at that side of the edge remote from the other edge.

In accordance with a third aspect of the invention there is provided a centrifuge specimen carrier and holder, the carrier comprising an inverted T-shape part and means by which the carrier can be pivotally mounted on the rotor of a centrifuge in the region of the free end of the upright limb of said part, and the holder containing recesses for receiving specimen containers and being of a form able to engage over and about the upright limb of said part and to rest on the horizontal limbs of the said part.

In accordance with a fourth aspect of the invention, there is provided a centrifuge specimen holder of rigid material containing recesses for receiving specimen containers and which holder can be supported in a centrifuge on a carrier comprising an inverted T-shaped part in that the holder is of a form able to engage over and about the upright limb of said part and to rest on the horizontal lambs of said part.

For a better understanding of the invention and to show how the same may be carried into effect, reference will now be made by way of example, to the accompanying drawings, in which.

Figure 1:
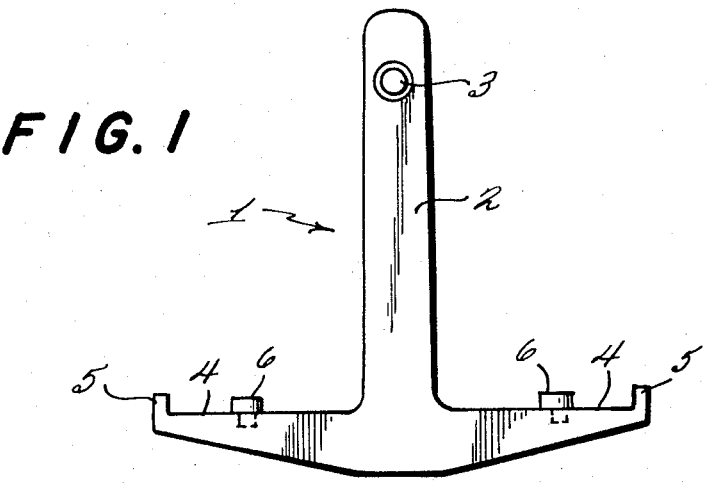
FIGURE 1 shows a side elevation of a carrier for a centrifuge.

FIGURE 1 illustrates a specimen carrier for a centrifuge. A centrifuge of the kind considered comprises a rotatable head adapted to cary a plurality of such carriers which are pivotally mounted with respect to the head as will be more fully described hereinbelow. Each carrier will support specimens to be centrifuged. In the present case, the carrier comprises a body 1 of duralumin or magnesium of an inverted T-shape having near the upper end of its upright portion 2 a shaft 3, by the ends of which the carrier is pivotally mounted on the centrifuge head at regions of the shaft closely adjacent the portion 2. The particular mounting of this shaft 3 in the portion 2 will be described in more detail hereinbelow. The lower part of the body 1 comprises two laterally extending arms 4, each of which carries at its outermost edge a locating ledge 5 and at its center a locating pin 6. These pins and ledges are provided for the location on the carrier of a perspex or moulded polyurethane holder illustrated in FIGURE 2. It will be seen that, if required, the pins only can be provided for location.

Figure 2:
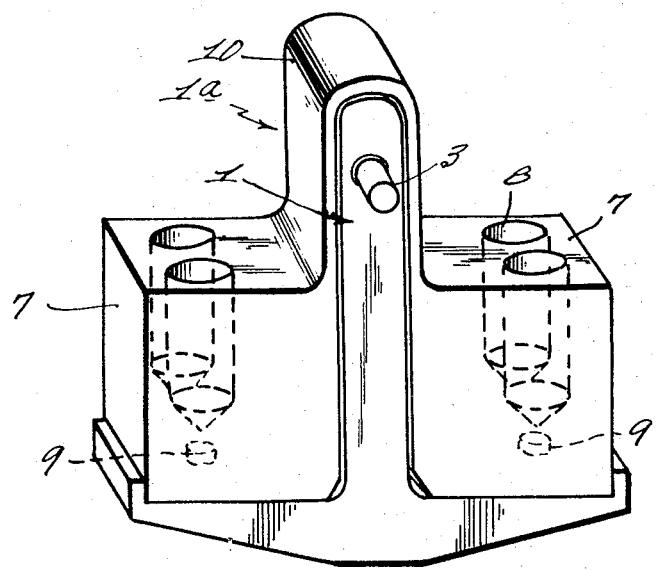
FIGURE 2 shows in perspective a holder, for holding a number of tubes for specimens to be centrifuged, and mounted on the carrier of FIGURE 1.

As shown in FIGURE 2, the holder 1a comprises two specimen supporting parts 7, each of which contains one or a plurality of tubular recesses 8 for the mounting of specimen containers. The lower surface of each part 7 is provided with a hole 9 for engaging about the head of the respective pin 6. The parts 7 are interconnected at their upper surfaces by a U-shaped portion 10, the form of the holder being such that the portion 10 may engage about the part 2 of the carrier whilst the parts 7 of the holder will lie on the arms 4 of the carrier. In this way, the weight of the carrier can be made much less than that of carriers of the type which do not have a holder and which are themselves provided with the tubular apertures for receiving specimen containers. In addition, the provision of a plurality of holders for a centrifuge will enable sets of specimen containers to be stored in their holders before and after centrifuging. Furthermore, the fact that the shaft is mounted at the upper end of the carrier produces the effect that the center of gravity of the carrier is at a substantial distance below the shaft whereby, if the shaft is mounted on knife edges and a pointer is attached to the carrier, the carrier supporting a holder with a number of specimen tubes can be easily balanced by adjusting the weight distribution of the carrier and holder whilst watching the movement of the end of the pointer over a dial. A relatively large movement of the pointer can be obtained even with a slight out-of-balance condition. Balancing is, of course, most important in high speed centrifuges. Finally, it is to be noted that the holder can be made from any one of a number of light materials, for example, nylon polythene.

Figure 3:
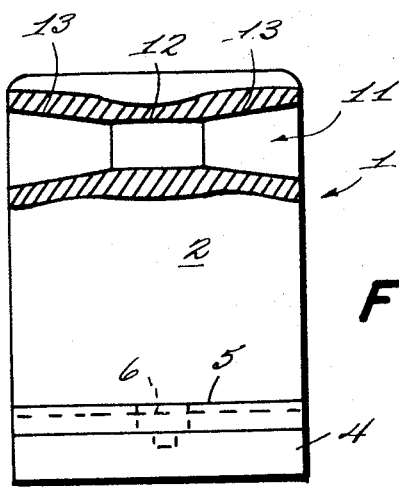
FIGURE 3 is a view of a carrier at right angles to the view of FIGURE 1 and in partial cross-section.

FIGURE 3 shows the carrier with a passage 11, shown in cross-section, in the upright portion 2 of the carrier. In this passage the stainless steel shaft 3, not shown in this figure, is to be mounted. This passage comprises a central portion 12, in which the shaft is held as a press fit, and two outwardly diverging portions 13 formed by a tapered reamer. As seen in cross-section, the passage has two opposite edges which approximate to the arc of a circle centered on a line at right angles to the axis of the passage and passing through the center of the axis. In the present example, it will be seen that the edges are provided by the three chords of the arc of the circle, these chords deviating from the arc by an amount which is very small in comparison with the radius of the arc. In the embodiment illustrated, the diameter of the passages increases from between 0.3745 to 0.3750 inch at the center to between 0.3785 to 0.3790 at the ends, with a passage length of 2¼ inches. There is therefore, an increase of passage diameter of about 0.002 inch per inch length of passage. Furthermore, the radius of the arc in this case is about 26.4 feet.

The edges may, of course, have many other forms which deviate from the arc of the circle by an amount which is small with respect to the radius of the arc. Thus, at least portions of these edges of the passage may be curved. However, where there is a portion of the passage having opposite edges which are parallel, that portion will be the central portion and will have a length which is less than one-half of the total length of the passage. The effect of this shape of the passage is that, when the carrier is operating in the centrifuge and is under load, the shaft will be allowed to flex under the load, and will act as a uniformly loaded beam supported at its ends. If, instead, the shaft should be mounted as a press fit in a passage entirely in the form of a cylinder having parallel sides, then, under load, the portions of the shaft emerging from the carrier would be subjected to a shearing stress. It has been found that by the use of a passage such as is illustrated in FIGURE 3, higher centrifuge speeds may be obtained than with a passage of similar dimensions having straight parallel sides and which latter passage would produce substantial shearing stresses on the shaft as has already been noted.

One method of designing the configuration of the passage will now be considered. In this method one constructs a carrier having a parallel sided passage in which a shaft is mounted as a press fit. The carrier is then loaded up to the normal maximum load to be experienced in operation, for example 1.7 tons, this causing, owing to the stress produced at the outer ends of the passage, a curvature of the top of the carrier. The distance between the highest and lowest point of the top of the carrier is measured and may be, for example, two thousandths of an inch. This dimension gives the required difference between the radius of the central portion 12 of the passage and the radius of the outer ends of the portions 13 and from which dimension the degree of taper required is thus readily apparent. With the carrier constructed in this manner, and when it is operated up to its normal load, the shaft will flex to conform substantially with the shape of the passage, whereby a uniformly loaded beam operation is approached.

Figure 4:
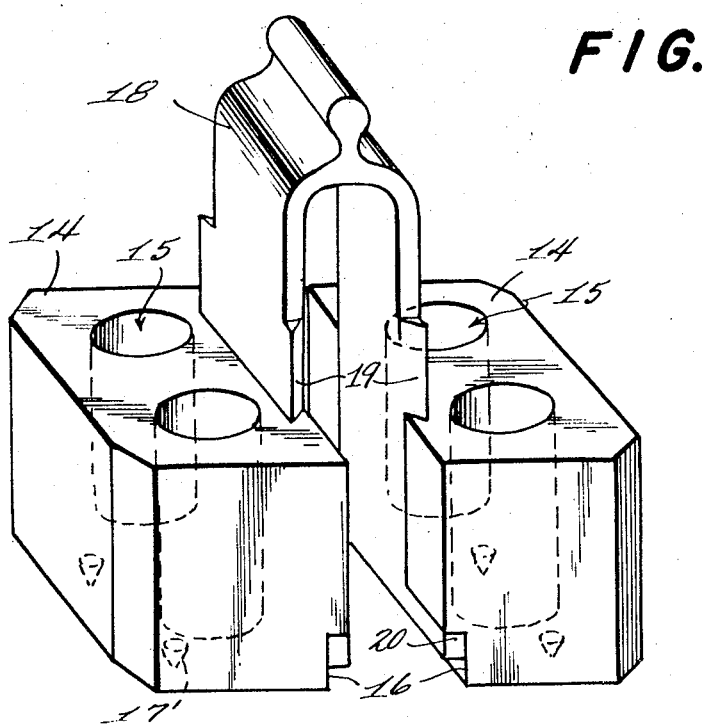
FIGURE 4 is a perspective view of a second form of a holder.

FIGURE 4 shows an alternative form of holder formed of three parts dove-tailed together. Thus there are supporting parts 14 each of which contains two tubular recesses 15 for specimen containers, and, at their facing sides, dove-tail slots. Cut-away portions 16 are provided at the lower facing edges and the lower surfaces carry pegs 17 for engaging in corresponding holes in the carrier. The parts 14 are connected by a U-shaped part 18 formed at its edges 19 so as slidably to engage in the dove-tail slots of the parts 14. At the lower edge of each limb of the part 18 are extensions 20 engaging in the cutaway portions 16 to prevent disengagement of the parts when the adaptor is in operation.

Figure 5:
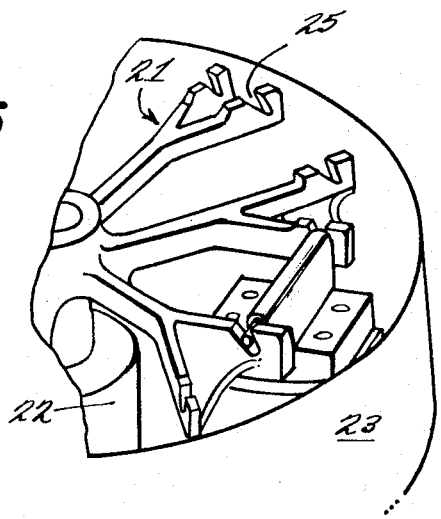
FIGURE 5 is a perspective cut-away view of a centrifuge having a head to receive a number of specimen carriers.

FIGURE 5 is a cut-away view of a centrifuge having a head 21 mounted on a motor 22 in a bowl 23. The head comprises a number of spiders 24 at the ends of which are forks containing slots 25 for receiving the shafts 3 of the carriers. In the present view, only one carrier with its holder is shown for clarity.

What is claimed is:

1. A centrifuge comprising: a rotor, a shaft mounted on said rotor and extending in a plane at right angles to the axis of rotation of said rotor and the axis of said shaft being at right angles to that radius of said rotor which extends to the center of said shaft, and a carrier for specimens to be centrifuged, a portion of which carrier defines a passage extending through said carrier with said shaft within and extending at each end from said passage whereby said carrier is pivotally mounted with respect to said rotor and said passage having been so formed prior to the insertion of said shaft that said passage has, as seen in a cross-section, containing the axis of said passage, two opposite edges each of which is in the form of an arc of a circle of finite radius having its center disposed on a line at right angles to the axis of, and mid-way between the ends of said passage and which center is at that side of said edge remote from the other of said edges.

2. A centrifuge comprising: a rotor, a shaft mounted on said rotor and extending in a plane at right angles to the axis of rotation of said rotor and the axis of said shaft being at right angles to that radius of said rotor which extends to the center of said shaft, and a carrier for specimens to be centrifuged, a portion of which carrier defines a passage extending through said carrier with said shaft within and extending at each end from said passage whereby said carrier is pivotally mounted with respect to said rotor and said passage having been so formed prior to the insertion of said shaft that said passage has, as seen in a cross-section containing the axis of said passage, two opposite edges, each of which has the form of three adjacent chords of an arc of a circle of finite radius having its center disposed on a line at right angles to the axis of, and mid-way between the ends of said passage and which center is at that side of said edge remote from the other of said edges.

3. A centrifuge comprising: a rotor, a shaft mounted on said rotor and extending in a plane at right angles to the axis of rotation of said rotor and the axis of said shaft being at right angles to that radius of said rotor which extends to the center of said shaft; and a carrier for specimens to be centrifuged a portion of which carrier defines a passage extending through said carrier with said shaft within, a press fit at the center and extending at each end from said passage whereby said carrier is pivotally mounted with respect to said rotor and said passage having been so formed prior to the insertion of said shaft that said passage has, as seen in cross-section containing the axis of said passage, two opposite edges each of which has the form of three adjacent chords of an arc of a circle of finite radius having its center disposed on a line at right angles to the axis of, and mid-way between the ends of, said passage and which center is at that side of said edge remote from the other of said edges.

4. A centrifuge comprising: a rotor, a shaft supported by said rotor and extending in a plane at right angles to the axis of rotation of said rotor and the axis of said shaft being at right angles to that radius of said rotor which extends to the center of said shaft, a specimen supporting carrier comprising an inverted T-shape part defining an upright limb of said carrier and two horizontal limbs of said carrier and said upright limb defining through said upright limb a passage wth said shaft within and extending at each end from said passage whereby said carrier is pivotally mounted with respect to said rotor, and the said passage having, as seen in a cross-section containing the axis of said passage, two opposite edges each of which is in the form of an arc of a circle of finite radius having its center disposed on a line at right angles to the axis of, and mid-way between the ends of, said passage and which center is at that side of said edge remote from the other of said edges; and a specimen holder having portions defining apertures in the said holder for receiving specimen containers and a portion containing a recess receiving said upright limb of said carrier whilst said portions defining said apertures rest on said two horizontal limbs of said carrier.

5. A body supporting arrangement comprising: a supporting shaft; said body, a portion of which defines a passage extending through said body with said shaft held against axial movement relative to said body, said shaft lying within and extending at each end from said passage and said passage having been so formed prior to the insertion of said shaft that said passage has, as seen in cross-section containing the axis of said passage, two opposite edges each of which at least approximates an arc of a circle of finite radius having its center disposed on a line at right angles to the axis of, and mid-way between the ends of, said passage and which center is at that side of said edge remote from the other of said edges thereby to permit flexing of said shaft within the passage; and supporting means having supporting portions fixed with respect to each other and supporting respective end regions of said shaft, said shaft being free to rotate about its axis relative to said supporting means and free to flex from end to end except for whatever restraint against flexing is imparted at a location intermediate the end of said shaft by said body and substantially without restraint from said supporting means.

6. An arrangement as claimed in claim 5, wherein the difference between the distance separating said edges at the center of said passage and the distance separating said edges at the ends of said passage is substantially equal to 0.002 x *n* inches, where *n* is the length of said passage in inches.

7. An arrangement as claimed in claim 5, wherein said shaft is a press fit at the center of said passage.

8. A body supporting arrangement comprising a supporting shaft; said body, a portion of which defines a passage extending through said body with said shaft held against axial movement relative to said body, said shaft lying within and extending at each end from said passage and said passage having been so formed prior to the insertion of said shaft that said passage has, as seen in cross-section containing the axis of said passage, two opposite edges, each of which has the form of at least three consecutive chords of an arc of a circle of finite radius having its center disposed on a line at right angles to the axis of, and mid-way between the ends of, said passage and which center is at that side of said edge remote from the other of said edges thereby to permit flexing of said shaft within the passage; and supporting means having supporting portions fixed with respect to each other and supporting respective end regions of said shaft, said shaft being free to rotate about its axis relative to said supporting means and free to flex from end to end except for whatever restraint against flexing is imparted at a location intermediate the ends of said shaft by said body and substantially without restraint from said supporting means.

9. An arrangement as claimed in claim 8, wherein the difference between the distance separating said edges at the center of said passage and the distance separating said edges at the ends of said passage is substantially equal to 0.002 x *n* inches, where *n* is the length of said passage in inches.

10. An arrangement as claimed in claim 8, wherein said shaft is a press fit at the center of said passage.

11. A body supporting arrangement comprising: a shaft; said body, a portion of which defines a passage through said body with said shaft within, held against axial movement relative to said body at the center of and extending at each end from said passage and said passage having been so formed prior to the insertion of said shaft that said passage has, as seen in cross-section containing the axis of said passage an edge which is the form of at least three consecutive chords of a circle of finite radius having its center of curvature disposed on a line at right angles to the axis of, and mid-way between the ends of, said passage and which is at that side of said edge remote from the opposite edge of the passage thereby to permit said shaft to flex within said passage; and supporting means supporting the opposite end regions of said shaft, said shaft being free to rotate about its axis relative to said supporting means and free to flex from end to end except for whatever restraint against flexing is imparted at a location intermediate the ends of said shaft by said body and substantially without restraint from said supporting means.

12. A centrifuge comprising: a rotor having supporting means for supporting specimen carriers; a shaft supported at both opposite end regions of said shaft by said supporting means and extending in a plane at right angles to the axis of rotation of said rotor and the axis of said shaft being at right angles to that radius of said rotor which extends to the center of said shaft; and a carrier for specimens to be centrifuged, a portion of which carrier defines a passage extending through said carrier with said shaft held against axial movement relative to said carrier, said shaft lying within and extending at each end from said passage, said shaft being free to rotate about its axis relative to said supporting means whereby said carrier is pivotally mounted with respect to said rotor, said shaft also being free to flex from end to end except for whatever restraint against flexing is imparted at a location intermediate the ends of said shaft by said carrier and substantially without restraint from said supporting means, and said passage having been so formed prior to the insertion of said shaft that said passage has, as seen in a cross-section containing the axis of said passage, two opposite edges each of which is in the form of an arc of a circle of finite radius having its center disposed on a line at right angles to the axis of, and midway between the ends of, said passage and which center is at that side of said edge remote from the other of said edges.

13. A centrifuge as claimed in claim 12, wherein said shaft is a press fit at the center of said passage.

14. A centrifuge comprising: a rotor having supporting means for supporting specimen carriers; a shaft supported at both opposite end regions by said supporting means and extending in a plane at right angles to the axis of rotation of said rotor and the axis of said shaft being at right angles to that radius of said rotor which extends to the center of said shaft; and a carrier for specimens to be centrifuged, a portion of which carrier defines a passage extending through said carrier with said shaft held against axial movement relative to said carrier within and extending at each end from said passage, said shaft being free to rotate about its axis relative to said supporting means whereby said carrier is pivotally mounted with respect to said rotor, said shaft also being free to flex from end to end except for whatever restraint against flexing is imparted at a location intermediate the ends of said shaft by said carrier and substantially without restraint from said supporting means, and said passage having been so formed prior to the insertion of said shaft that said passage has, as seen in a cross-section containing the axis of said passage, two opposite edges, each of which has the form of at least three consecutive chords of an arc of a circle of finite radius having its center disposed on a line at right angles to the axis of, and mid-way between the ends of said passage and which center is at that side of said edge remote from the other of said edges.

(References on following page)

References Cited

UNITED STATES PATENTS

| | | | |
|---|---|---|---|
| 2,692,616 | 10/1954 | Glassenhart | 137—595 XR |
| 3,016,920 | 1/1962 | Thomsen et al. | 137—625.65 |
| 3,159,376 | 12/1964 | Ray | 251—86 |
| 3,202,348 | 8/1965 | Strohmaier | 233—26 |

FOREIGN PATENTS 107,213  9/1927  Austria.

HENRY T. KLINKSIEK, *Primary Examiner.*

U.S. Cl. X.R.

308—72